US012642630B2

(12) United States Patent
Kim et al.

(10) Patent No.: US 12,642,630 B2
(45) Date of Patent: Jun. 2, 2026

(54) METHOD FOR DETERMINING OBJECT AREA FROM THREE-DIMENSIONAL MODEL, AND THREE-DIMENSIONAL MODEL PROCESSING DEVICE

(71) Applicant: MEDIT CORP., Seoul (KR)

(72) Inventors: Du Su Kim, Seoul (KR); Sung Hoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 321 days.

(21) Appl. No.: 18/034,238

(22) PCT Filed: Oct. 13, 2021

(86) PCT No.: PCT/KR2021/014123
§ 371 (c)(1),
(2) Date: Apr. 27, 2023

(87) PCT Pub. No.: WO2022/092627
PCT Pub. Date: May 5, 2022

(65) Prior Publication Data
US 2023/0390032 A1 Dec. 7, 2023

(30) Foreign Application Priority Data

Oct. 28, 2020 (KR) ........................ 10-2020-0141577
Nov. 30, 2020 (KR) ........................ 10-2020-0165076

(51) Int. Cl.
*G06T 17/00* (2006.01)
*A61C 7/00* (2006.01)
(Continued)

(52) U.S. Cl.
CPC .......... *A61C 13/0004* (2013.01); *A61C 7/002* (2013.01); *A61C 9/0053* (2013.01); *A61C 13/34* (2013.01); *G06T 17/00* (2013.01)

(58) Field of Classification Search
CPC ... A61C 13/0004; A61C 7/002; A61C 9/0053; A61C 13/34; G06T 17/00
See application file for complete search history.

(56) References Cited

U.S. PATENT DOCUMENTS

| | | | | |
|---|---|---|---|---|
| 6,271,875 | B1 * | 8/2001 | Shimizu | G06F 3/011 |
| | | | | 348/42 |
| 7,369,691 | B2 * | 5/2008 | Kondo | G06T 15/08 |
| | | | | 382/128 |

(Continued)

FOREIGN PATENT DOCUMENTS

| | | |
|---|---|---|
| CN | 110087577 A | 8/2019 |
| JP | 2020-516335 A | 6/2020 |

(Continued)

OTHER PUBLICATIONS

Adobe, "Adobe Photoshop Tutorial: Magnetic Lasso Tool" (https://www.youtube.com/watch?v=o-m3loHVbJw), 2009, Youtube, Incredible Tutorial (Year: 2009).*

(Continued)

*Primary Examiner* — Cheng Yuan Tseng
(74) *Attorney, Agent, or Firm* — Sughrue Mion, PLLC

(57) ABSTRACT
Provided is an area determination method for determining an area corresponding to an object from a three-dimensional model of an oral cavity. The area determination method includes: obtaining the three-dimensional model; determining a seed point on the three-dimensional model; based on the seed point, determining a reference point on the three-dimensional model; determining an area corresponding to an object, by gradually expanding a selection area based on the reference point; and displaying the determined area on the three-dimensional model.

17 Claims, 24 Drawing Sheets

(51) Int. Cl.

| | |
|---|---|
| *A61C 9/00* | (2006.01) |
| *A61C 13/00* | (2006.01) |
| *A61C 13/34* | (2006.01) |

(56) References Cited

U.S. PATENT DOCUMENTS

| | | | | |
|---|---|---|---|---|
| 7,764,828 | B2 * | 7/2010 | Sasaki | G06V 40/171 |
| | | | | 345/473 |
| 8,150,205 | B2 * | 4/2012 | Watanabe | G06V 40/171 |
| | | | | 345/646 |
| 9,013,481 | B2 * | 4/2015 | Kikuta | G06T 17/20 |
| | | | | 345/420 |
| 9,451,873 | B1 | 9/2016 | Kopelman et al. | |
| 9,672,444 | B2 * | 6/2017 | Mehl | A61C 9/0053 |
| 10,420,613 | B2 * | 9/2019 | Azevedo Da Silva | |
| | | | | G16H 50/50 |
| 10,874,490 | B2 * | 12/2020 | Ruppert | A61C 13/0004 |
| 11,107,188 | B2 * | 8/2021 | Ouyang | G06T 7/564 |
| 11,213,374 | B2 * | 1/2022 | Lancelle | A61C 13/0004 |
| 11,562,532 | B2 * | 1/2023 | Kushibe | G06T 7/0014 |
| 11,896,455 | B2 | 2/2024 | Chen et al. | |
| 12,102,465 | B2 * | 10/2024 | Park | A61B 5/0088 |
| 2009/0040224 | A1 * | 2/2009 | Igarashi | G06T 19/00 |
| | | | | 345/427 |
| 2011/0136077 | A1 * | 6/2011 | De Moyer | A61C 13/0004 |
| | | | | 433/213 |
| 2013/0323673 | A1 * | 12/2013 | Hakomori | A61B 1/00009 |
| | | | | 433/29 |
| 2017/0367789 | A1 | 12/2017 | Fujiwara et al. | |
| 2020/0015936 | A1 | 1/2020 | Ye et al. | |
| 2020/0015943 | A1 | 1/2020 | Reynard et al. | |
| 2021/0074061 | A1 * | 3/2021 | Brown | G06T 7/0012 |

FOREIGN PATENT DOCUMENTS

| | | | |
|---|---|---|---|
| KR | 10-1099732 | B1 | 12/2011 |
| KR | 10-1911693 | B1 | 1/2019 |
| KR | 10-1999465 | B1 | 7/2019 |
| WO | 2016/143022 | A1 | 9/2016 |
| WO | 2019/229092 | A1 | 12/2019 |

OTHER PUBLICATIONS

Jiawen He, et al., "Tooth Point Cloud Segmentation of Dental Model Based on Region Growing", AIAM2020—2nd International Conference on Artificial Intelligence and Advanced Manufacture, 2020, pp. 489-492.

Mingxi Zhao, et al., "Interactive Tooth Segmentation of Dental Models", Proceedings of the 2005 IEEE, Engineering in Medicine and Biology 27th Annual Conference, Sep. 1-4, 2005, pp. 654-657.

Shuai Yang, et al., "Interactive Tooth Segmentation Method of Dental Model based on Geodesic", Advances in Engineering Research, 2017, vol. 138, pp. 953-957.

Extended European Search Report issued Jul. 23, 2024 in Application No. 21886621.8.

International Search Report for PCT/KR2021/014123 dated Jan. 20, 2022 [PCT/ISA/210].

Request for the Submission of an Opinion dated Jul. 21, 2022 for Korean Patent Application No. 10-2020-0165076.

Written Decision on Registration dated Jan. 3, 2023 for Koran Patent Application No. 10-2020- 0165076.

Chinese Office Action dated Apr. 29, 2025 in Application No. 202180072440.6.

* cited by examiner

200

210

205

OBTAIN THREE-DIMENSIONAL MODEL ———— S401

DETERMINE REFERENCE POINT ON
THREE-DIMENSIONAL MODEL ———— S402

DETERMINE AREA CORRESPONDING
OBJECT BY GRADUALLY EXPANDING
SELECTION AREA BASED ON REFERENCE POINT ———— S403

DISPLAY, ON THREE-DIMENSIONAL MODEL,
AREA CORRESPONDING TO OBJECT ———— S404

913

901

931

1022

METHOD FOR DETERMINING OBJECT AREA FROM THREE-DIMENSIONAL MODEL, AND THREE-DIMENSIONAL MODEL PROCESSING DEVICE

CROSS REFERENCE TO RELATED APPLICATIONS

This application is a National Stage of International Application No. PCT/KR2021/014123 filed Oct. 13, 2021, claiming priority based on Korean Patent Application Nos. 10-2020-0141577 filed Oct. 28, 2020 and 10-2020-0165076 filed Nov. 30, 2020.

TECHNICAL FIELD

The disclosure relates to a method and apparatus for processing a three-dimensional model, and more particularly, to a method and apparatus for determining an area corresponding to an object from a three-dimensional model of an oral cavity.

BACKGROUND ART

Dental computer aided design/computer aided manufacturing (CAD/CAM) technology is widely used in dental treatment, particularly, in prosthetic treatment. In dental treatment using CAD/CAM, it is most important to obtain precise three-dimensional data about the shape of an object, such as a patient's teeth, gums, and jawbone. In performing dental treatment, when three-dimensional data obtained from an object is used, calculations may be accurately performed by a computer.

For example, methods, such as computed tomography (CT), magnetic resonance imaging (MRI), and optical scanning, may be used to obtain three-dimensional data of an object during a dental CAD/CAM treatment.

In the field of dental CAD/CAM, three-dimensional scanning apparatuses are widely used. A three-dimensional scanning apparatus may obtain three-dimensional surface shape information by using light reflected from an object. For example, an impression of a tooth, a plaster model obtained for the impression, or a three-dimensional model of the surface of the tooth may be obtained. Surface data may be recorded in a form of a polygonal mesh and include position information of vertices of the surface of an object and connection relationship information of respective vertices. Alternatively, surface data may be recorded in a form of a point cloud and include position information of vertices of the surface of an object.

DISCLOSURE

Technical Problem

When a three-dimensional model is obtained from scan data of an oral cavity and a plaster model, a prosthesis may be virtually designed or an orthodontic plan may be established by using the obtained three-dimensional model.

Information about an object (e.g., an individual tooth, gingiva, or the like) is required to design a virtual prosthesis and an orthodontic plan, and accordingly, information such as setting an object area may be added to the three-dimensional model.

However, in the related art, a method of manually selecting an area corresponding to an object from a three-dimensional model has been used to select an object area. Accordingly, a lot of time has taken or an unnecessary area has been set in the process of manually selecting the object area.

Technical Solution

According to an aspect of the disclosure, provided is an area determination method for determining an area corresponding to an object from a three-dimensional model of an oral cavity, the area determination method including: obtaining the three-dimensional model; determining a seed point on the three-dimensional model; based on the seed point, determining a reference point on the three-dimensional model; determining an area corresponding to an object, by gradually expanding a selection area based on the reference point; and displaying the determined area on the three-dimensional model.

Also, according to an embodiment of the disclosure, the area determination method may be provided, wherein the determining of the reference point includes determining the reference point, based on a curvature value of the seed point.

Also, according to an embodiment of the disclosure, the area determination method may be provided, wherein the three-dimensional model is obtained by a three-dimensional scanning apparatus and comprises surface shape information of a plurality of teeth and gingiva in the oral cavity, and the object is a tooth or gingiva.

Also, according to an embodiment of the disclosure, the area determination method may be provided, wherein the determining of the seed point includes: displaying the three-dimensional model; and determining the seed point, based on a user input for the displayed three-dimensional model.

Also, according to an embodiment of the disclosure, the area determination method may be provided, wherein the determining of the reference point includes determining the reference point, based on a curvature value of the seed point determined on the three-dimensional model, and the curvature value of the seed point includes at least one of a curvature value k1 having a largest absolute value among curvature values of a curve where normal planes and a curved surface of the object cross each other, the normal planes including a normal line of the seed point, and a curvature value k2 of a curve where an orthogonal normal plane and the curved surface of the object cross each other, the orthogonal normal plane being orthogonal to the normal planes and including the normal line of the seed point.

Also, according to an embodiment of the disclosure, the area determination method may be provided, wherein the determining of the reference point includes: when a curvature value of the seed point determined on the three-dimensional model is within a preset range, determining the seed point as the reference point; and when the curvature value of the seed point is not within the preset range, determining, as the reference point, another point having a curvature value within the preset range.

Also, according to an embodiment of the disclosure, the area determination method may be provided, wherein the determining of the area corresponding to the object includes, by gradually expanding a selection area from the reference point, determining a first area having a curvature value within a threshold range, based on a curvature value of the reference point.

Also, according to an embodiment of the disclosure, the area determination method may be provided, wherein the determining of the area corresponding to the object further includes determining a second area corresponding to the object, by repeating an area expansion and shrinkage process from the determined first area.

Also, according to an embodiment of the disclosure, the area determination method may be provided, wherein the determining of the area corresponding to the object includes, by gradually expanding a selection area from the reference point, determining a first area having a curvature value within a threshold range, based on a curvature value of the reference point, and the area determination method further includes: changing the threshold range, based on a drag input of a user; and determining a second area, based on the changed threshold range.

Also, according to an embodiment of the disclosure, the area determination method may be provided, wherein the determining of the seed point includes: performing segmentation of dividing the three-dimensional model into areas corresponding to a plurality of objects; and determining the seed point on one of the plurality of areas.

Also, according to an embodiment of the disclosure, the area determination method may be provided, the area determination method further including: displaying an image in which a plurality of teeth and a tooth number corresponding to each of the plurality of teeth are displayed on the three-dimensional model; and receiving a user input for selecting, as the object, a first tooth from among the plurality of teeth, wherein the determining of the reference point includes determining the reference point on the first tooth.

According to another aspect of the disclosure, provided is a three-dimensional model processing apparatus for processing a three-dimensional model of an oral cavity, the three-dimensional model processing apparatus including: a display displaying an image rendered from the three-dimensional model; and at least one processor configured to determine a seed point on the three-dimensional model, based on the seed point, determine a reference point on the three-dimensional model, determine an area corresponding to an object, by gradually expanding a selection area based on the reference point, and control the display to display the area determined on the three-dimensional model.

Also, according to an embodiment of the disclosure, the three-dimensional model processing apparatus may be provided, wherein the display displays the three-dimensional model, and the at least one processor is further configured to determine the seed point, based on a user input for the displayed three-dimensional model.

Also, according to an embodiment of the disclosure, the three-dimensional model processing apparatus may be provided, wherein the at least one processor is further configured to, by gradually expanding a selection area from the reference point, determine a first area having a curvature value within a threshold range, based on a curvature value of the reference point, and determine a second area corresponding to the object, by repeating an area expansion and shrinkage process from the determined first area.

Also, according to an embodiment of the disclosure, the three-dimensional model processing apparatus may be provided, wherein the display displays an image in which a plurality of teeth and a tooth number corresponding to each of the plurality of teeth are displayed on the three-dimensional model, and the at least one processor further is configured to receive a user input for selecting, as the object, a first tooth from among the plurality of teeth, and determine the reference point on the first tooth.

According to another aspect of the disclosure, provided is an area determination method for determining an area from a three-dimensional model, the area determination method including: obtaining a three-dimensional model of an oral cavity; determining at least a partial area of an area to be selected in the oral cavity; based on the determined at least partial area, determining, from the three-dimensional model, a first area corresponding to the area to be selected; and displaying the determined first area.

Also, according to an embodiment of the disclosure, the area determination method may be provided, wherein the determining of the at least partial area includes determining the at least partial area, based on a user input.

Also, according to an embodiment of the disclosure, the area determination method may be provided, wherein the user input includes at least one gesture among a click, a hover, and a drag.

Also, according to an embodiment of the disclosure, the area determination method may be provided, the area determination method further including performing segmentation of dividing the three-dimensional model into a plurality of areas respectively corresponding to a plurality of teeth, wherein the determining of the at least partial area includes: based on the segmented three-dimensional model, selecting one tooth from among the plurality of teeth; and determining the at least partial area, based on a seed point on the selected tooth.

Advantageous Effects

According to disclosed embodiments, the accuracy of selecting an object area may be increased, and a required amount of time may be reduced.

DESCRIPTION OF DRAWINGS

The disclosure may be readily understood by combinations of the following detailed descriptions and the accompanying drawings, and reference numerals may refer to structural elements.

MODE FOR INVENTION

Figure 1:
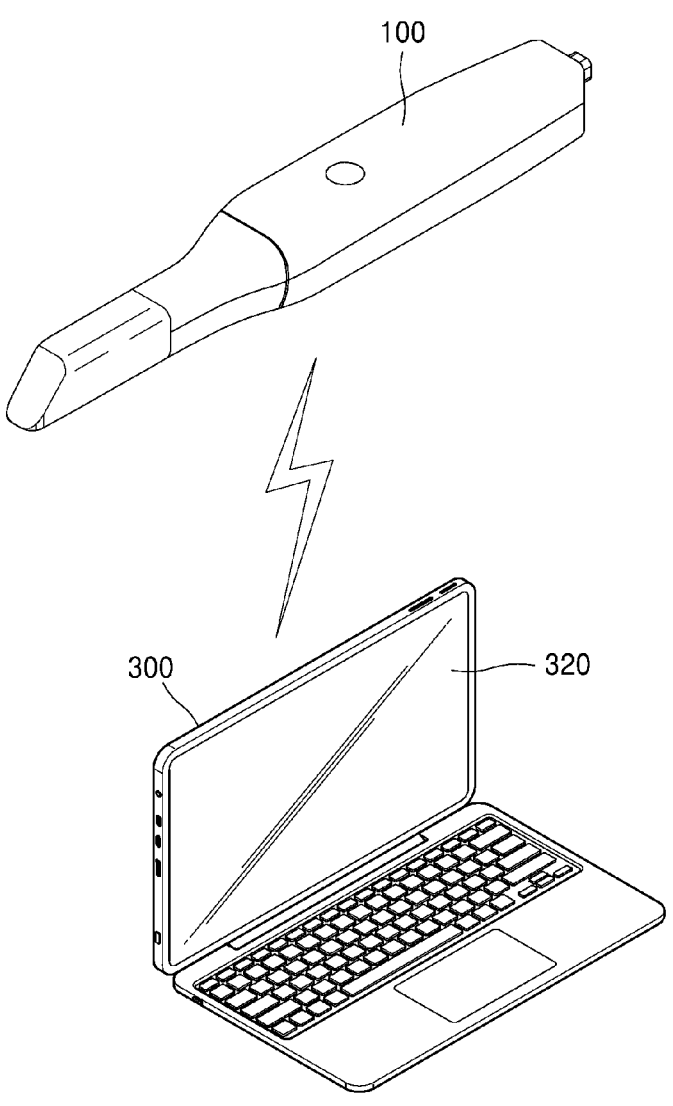
FIG. 1 is a diagram for describing a three-dimensional model processing system according to an embodiment.

The specification clarifies the scope of the disclosure, explains the principles of the disclosure, and discloses embodiments, such that the embodiments of the disclosure may be practiced by those of ordinary skill in the art. The disclosed embodiments may be implemented in various forms.

Throughout the specification, like reference numerals refer to like elements. All elements in embodiments are not described herein, and general descriptions or redundant descriptions of the embodiments in the technical field to which the disclosure pertains will be omitted. The term 'part' or 'portion' used herein may be implemented in software or hardware, and according to the embodiments, a plurality of 'parts' or 'portions' may be implemented as one unit or element, or a single 'part' or 'portion' may also include a plurality of units or elements. Hereinafter, the principles and embodiments of the disclosure will be described with reference to the accompanying drawings.

As used in the disclosure, the term 'object' refers to an object of which image is to be captured and may include a human, an animal, or a part thereof. For example, the object may include a body part (such as an organ), an artificial structure attachable onto or insertable into the object, or a phantom. For example, the object may include a tooth, gingiva, at least a portion of an oral cavity, and/or an artificial structure insertable into the oral cavity (e.g., an orthodontic appliance including brackets and wires, a dental restoration including implants, artificial teeth, inlays, and onlays, an orthodontic aid inserted into the oral cavity, etc.), a tooth or gingiva to which an artificial structure is attached, etc.

As used in the disclosure, the term 'image' may refer to a two-dimensional image of an object, or a three-dimensional model or a three-dimensional image representing the object in three dimensions. In the disclosure, the image may include both a two-dimensional frame and a three-dimensional frame. For example, the image may include a two-dimensional frame including two-dimensional images obtained at different viewpoints of an object, or a three-dimensional frame expressed in a form of a point cloud or a polygonal mesh.

Also, as used in the disclosure, the term 'data' may refer to information required to represent an object in two dimensions or three dimensions, e.g., raw data obtained from at least one image sensor. In detail, the raw data may include two-dimensional images obtained to generate a three-dimensional model of an object. The raw data may include two-dimensional images of different viewpoints obtained by a plurality of image sensors when an object is scanned using a three-dimensional scanner (e.g., an intraoral scanner). Also, as used in the disclosure, the term 'data' may refer to a three-dimensional model representing three-dimensional characteristics of an object including at least one of a tooth, gingiva, and an artificial structure attached to a tooth or gingiva.

Hereinafter, embodiments will be described in detail with reference to the accompanying drawings.

FIG. 1 is a diagram for describing a three-dimensional model processing system according to an embodiment.

As shown in FIG. 1, the three-dimensional model processing system according to an embodiment of the disclosure may include a three-dimensional scanning apparatus 100 and a three-dimensional model processing apparatus 300.

The three-dimensional model processing system according to an embodiment projects patterned light onto an object by using the three-dimensional scanning apparatus 100 and scans the object onto which the patterned light is projected, and thus may obtain a three-dimensional model representing a shape of the object by using the principle of triangulation by transformation of a pattern. However, a method of obtaining the three-dimensional model using the three-dimensional scanning apparatus 100 is not limited thereto, and the three-dimensional model may be obtained by using various methods depending on implementation.

The three-dimensional scanning apparatus 100 according to an embodiment may transmit raw data obtained from the object to the three-dimensional model processing apparatus 300. The three-dimensional model processing apparatus 300 may generate a three-dimensional model representing a shape of a surface of the object in three dimensions, based on the received raw data. The three-dimensional model may include point cloud data or polygonal mesh data. The three-dimensional scanning apparatus 100 according to another embodiment may generate a three-dimensional frame by reconstructing raw data obtained from the object, and transmit the generated three-dimensional frame to the three-dimensional model processing apparatus 300.

The three-dimensional scanning apparatus 100 according to an embodiment may include a medical apparatus for obtaining a three-dimensional model of the oral cavity. In detail, the three-dimensional scanning apparatus 100 may be an apparatus which is inserted into the oral cavity to scan teeth in a contactless manner, and generates a three-dimensional model of the oral cavity including at least one tooth. Also, the three-dimensional scanning apparatus 100 may have a shape capable of being drawn in and out of the oral cavity and may scan the inside of the oral cavity of a patient by using at least one image sensor (e.g., an optical camera). In addition, the three-dimensional scanning apparatus 100 may include a table scanner.

The three-dimensional scanning apparatus 100 may obtain surface information about the object as raw data, to perform imaging on a surface of at least one of objects, such as a tooth in the oral cavity, gingiva, and an artificial structure (e.g., an orthodontic appliance including brackets and wires, an implant, an artificial tooth, an orthodontic aid inserted into the oral cavity, etc.) insertable into the oral cavity. The three-dimensional model processing apparatus 300 may obtain a three-dimensional model by performing a three-dimensional operation such as merging, based on the raw data, and may display, on a display of a screen, an image obtained by rendering the three-dimensional model.

The three-dimensional model processing apparatus 300 according to an embodiment may be connected to the three-dimensional scanning apparatus 100 through a wired or wireless communication network, and may receive, from the three-dimensional scanning apparatus 100, a three-dimensional frame or raw data obtained by scanning the object.

The three-dimensional model processing apparatus 300 may include any electronic apparatus capable of generating, processing, displaying, and/or transmitting an image or a three-dimensional model of the object, based on the received raw data or three-dimensional frame. For example, the three-dimensional model processing apparatus 300 may include a computing apparatus, such as a smartphone, a laptop computer, a desktop computer, a personal digital assistance (PDA), or a tablet personal computer (PC), but is not limited thereto.

The three-dimensional model processing apparatus 300 may generate at least one of information required for diagnosing an object and an image of the object, based on data received from the three-dimensional scanning apparatus 100, and may display the generated information and/or image through a display 320.

The three-dimensional model processing apparatus 300 according to an embodiment may analyze the three-dimensional model or image of the object, and process, display, and/or transmit a result of the analysis.

Also, the three-dimensional model processing apparatus 300 according to an embodiment may store or execute dedicated software linked to the three-dimensional scanning apparatus 100. The dedicated software may be referred to as a dedicated program or a dedicated application. When the three-dimensional model processing apparatus 300 operates in conjunction with the three-dimensional scanning apparatus 100, the dedicated software stored in the three-dimensional model processing apparatus 300 may be connected to the three-dimensional scanning apparatus 100 and receive, in real time, pieces of data obtained through object scanning. For example, there is a dedicated software corresponding to the company's intraoral scanner product "i500", the dedicated software processing data obtained through an intraoral scan using i500. The three-dimensional model processing apparatus 300 may store and execute the dedicated software corresponding to the product i500. The dedicated software may perform at least one operation for obtaining, processing, storing, and/or transmitting a three-dimensional model.

The dedicated software may also be stored in a processor or a memory of the three-dimensional model processing apparatus 300. Also, the dedicated software may provide a user interface for using data obtained by the three-dimensional scanning apparatus 100. A user interface screen provided by the dedicated software may include a three-dimensional model of an object generated according to the disclosed embodiment. For example, in the disclosed embodiment, the user interface screen provided by the dedicated software may include any one of user interface screens shown in the drawings to be described below.

In addition, for example, information on an individual tooth may be required to design a virtual prosthesis and an orthodontic plan. In order to select an area corresponding to an individual tooth, a method of manually selecting a tooth shape from a three-dimensional model for a plurality of teeth has been used in the related art.

Figure 2:
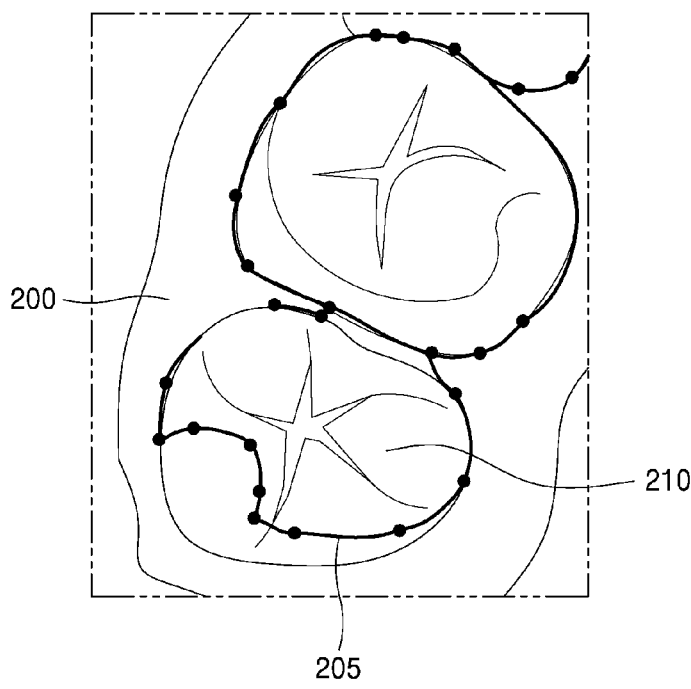
FIG. 2 is a diagram for describing a method of manually selecting an outer line of an individual tooth.

FIG. 2 is a diagram for describing a method of manually selecting an outer line of an individual tooth.

As shown in FIG. 2, in the related art, a user has manually selected a boundary area of a tooth 210 on a three-dimensional model image 200. When the user selects points on a boundary of the tooth 210, a three-dimensional model processing apparatus has determined an individual tooth area by connecting the points selected by the user and obtaining an outer line 205. Therefore, according to the related art, a lot of time has taken or an unnecessary area has been set in the process of manually selecting the individual tooth.

In order to solve the aforementioned problems, the three-dimensional model processing apparatus 300 according to various embodiments of the disclosure provides a method of automatically selecting an object area with high speed and high accuracy.

Figure 3:
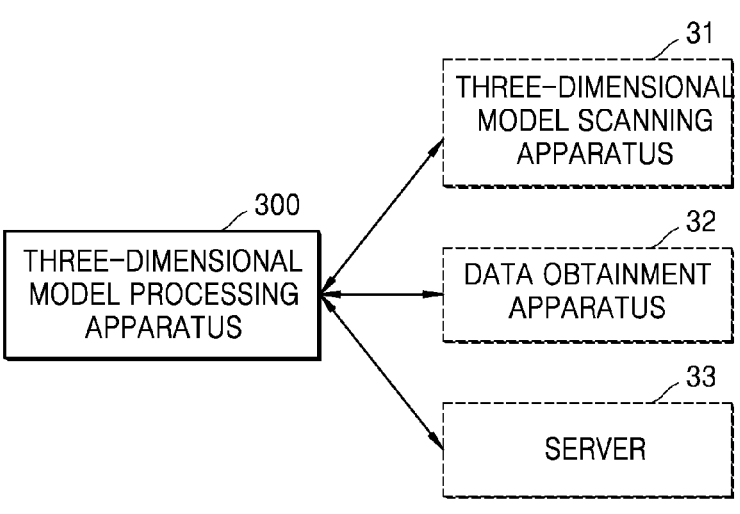
FIG. 3 is a block diagram of a three-dimensional model processing system according to an embodiment.

FIG. 3 is a block diagram of a three-dimensional model processing system according to an embodiment.

As shown in FIG. 3, the three-dimensional model processing apparatus 300 according to an embodiment may be connected to an external device or an external server through a wired or wireless communication network. The three-dimensional model processing apparatus 300 according to an embodiment may obtain data of an object from at least one of a three-dimensional scanning apparatus 31, a data obtaining apparatus 32 (e.g., a medical diagnosis apparatus such as computed tomography (CT) or magnetic resonance imaging (MRI)), and a server 33, and may process the data. Alternatively, the three-dimensional model processing apparatus 300 according to an embodiment may obtain and process data pre-stored in an internal memory.

According to various embodiments of the disclosure, the three-dimensional model processing apparatus 300 may determine an area corresponding to at least one object from a three-dimensional model of the oral cavity. The three-dimensional model processing apparatus 300 according to an embodiment may obtain a three-dimensional model of the oral cavity and determine at least a partial area of an area to be selected in the oral cavity. The three-dimensional model processing apparatus 300 according to an embodiment may determine at least a partial area based on a user input. For example, the user input may include at least one gesture among a click, a hover, and a drag.

For example, the three-dimensional model processing apparatus 300 may perform segmentation of dividing the three-dimensional model into a plurality of areas respectively corresponding to a plurality of teeth. The three-dimensional model processing apparatus 300 may select one tooth from among the plurality of teeth based on the segmented three-dimensional model. The three-dimensional model processing apparatus 300 may determine at least a partial area based on a seed point on the selected tooth.

The three-dimensional model processing apparatus 300 may determine, from the three-dimensional model, a first area corresponding to the area to be selected, based on the determined at least partial area. The three-dimensional model processing apparatus 300 may display the determined first area.

A specific method, performed by the three-dimensional model processing apparatus 300, of selecting the object area, according to various embodiments, will be described in more detail below with reference to FIGS. 4 to 14.

Figure 4:
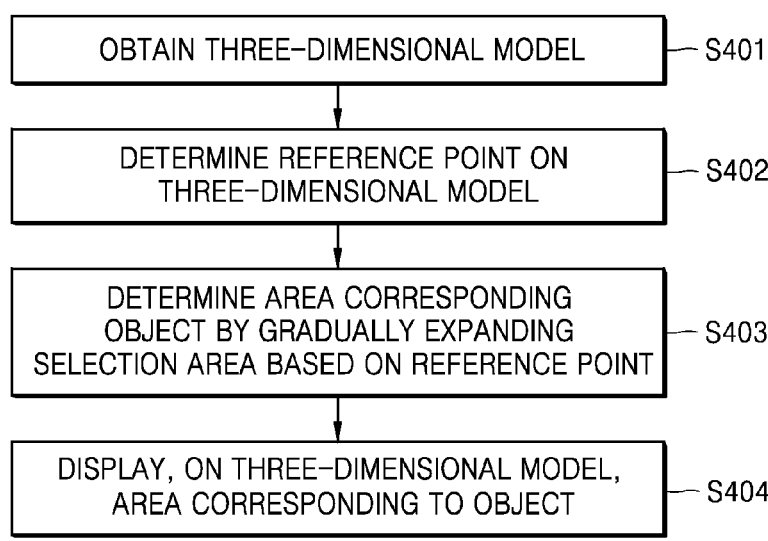
FIG. 4 is a flowchart of a method, performed by a three-dimensional model processing apparatus, of determining an object area from a three-dimensional model, according to an embodiment.

FIG. 4 is a flowchart of a method, performed by a three-dimensional model processing apparatus, of determining an object area from a three-dimensional model, according to an embodiment.

In operation S401, the three-dimensional model processing apparatus 300 according to an embodiment may obtain a three-dimensional model of the oral cavity. For example, a three-dimensional model including surface shape information of a plurality of teeth, gingiva, and/or an artificial structure in the oral cavity may be obtained. For example, the three-dimensional model may include scan data obtained by a three-dimensional scanning apparatus. The three-dimensional model processing apparatus 300 may obtain a three-dimensional model from an external apparatus such as a three-dimensional scanning apparatus, or an external server. Alternatively, the three-dimensional model processing apparatus 300 may obtain a three-dimensional model pre-stored in an internal memory.

The three-dimensional model processing apparatus 300 according to an embodiment may select a seed point on an area estimated to correspond to an object on the three-dimensional model. The seed point may refer to a point selected to determine an area corresponding to the object. For example, the three-dimensional model processing apparatus 300 may select a seed point on a first tooth among a plurality of teeth indicated by the three-dimensional model.

As an example, the three-dimensional model processing apparatus 300 may select the seed point based on a user input.

In order to receive a user input for selecting a seed point, first, the three-dimensional model processing apparatus 300 may display, on a screen, an image rendered from the three-dimensional model. The three-dimensional model processing apparatus 300 may display the three-dimensional model, receive a user input for selecting a point on the displayed three-dimensional model, and determine a seed point on the three-dimensional model based on a position of the selected point.

Figure 7:
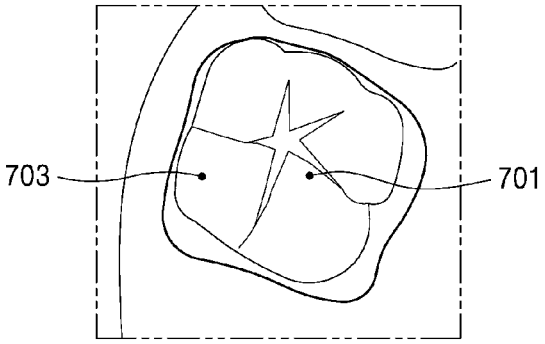
FIG. 7 shows a seed point and a reference point selected on a tooth, according to an embodiment.

FIG. 7 shows a portion of the three-dimensional model displayed by the three-dimensional model processing apparatus 300. The three-dimensional model processing apparatus 300 may receive a user input for selecting a seed point 701 on the three-dimensional model.

In order to select a seed point in a three-dimensional space based on a user input for an image displayed on a two-dimensional screen, the three-dimensional model processing apparatus 300 may determine a three-dimensional coordinate value corresponding to a position at which the user input is received. For example, the user input for selecting the seed point may include a tap gesture on a touch screen, a gesture of placing a mouse pointer on a screen (e.g., a hovering gesture), a gesture of placing the mouse pointer on the screen and clicking, or a gesture of clicking and then dragging.

For example, the three-dimensional model processing apparatus 300 may obtain x-axis and y-axis coordinate values of a displayed image on a screen coordinate system, based on a position at which a mouse click input of the user is received. The three-dimensional model processing apparatus 300 may convert the obtained x-axis and y-axis coordinate values into a three-dimensional model coordinate system, and determine a seed point within the three-dimensional model represented by triangle meshes. The three-dimensional model processing apparatus 300 may determine, as the seed point, a vertex corresponding to the converted coordinate values.

As another example, the three-dimensional model processing apparatus 300 may automatically select the seed point by analyzing the three-dimensional model.

Also, as another example, the three-dimensional model processing apparatus 300 may select a segmentation area as the seed point.

The three-dimensional model processing apparatus 300 according to an embodiment may perform segmentation of dividing the three-dimensional model into areas corresponding to a plurality of objects. The three-dimensional model processing apparatus 300 may determine a seed point on one area among a plurality of areas identified by the segmentation.

In detail, the three-dimensional model processing apparatus 300 may segment the three-dimensional model. As an example, the three-dimensional model processing apparatus 300 may use a template or artificial intelligence to divide the three-dimensional model into an area corresponding to at least one tooth and an area corresponding to gingiva, and may divide areas for the plurality of teeth into areas corresponding to individual teeth.

However, in the case of the related-art method of selecting an area corresponding to a preset object (e.g., a tooth or gingiva) by segmenting a three-dimensional model, there has been a limit in accurately selecting an area corresponding to an object. Depending on noise or resolution of a scanner, a tooth area determined through segmentation may include only a portion of an actual tooth area or may include an area outside the actual tooth area. Accordingly, according to the related-art method, there has been a limit in accurately identifying an area of an individual tooth. Therefore, the three-dimensional model processing apparatus 300 according to an embodiment may primarily perform segmentation, and then select a seed point on an area estimated as an area corresponding to the object through the segmentation. The aforementioned embodiment may be implemented without an input of a user.

In operation S402, the three-dimensional model processing apparatus 300 according to an embodiment may determine a reference point on the three-dimensional model. The three-dimensional model processing apparatus 300 according to an embodiment may determine the reference point on the three-dimensional model, based on a curvature value of the seed point.

Curvature refers to an indicator indicating a degree of curvature of a curved surface and may be expressed as a reciprocal of a radius of the curved surface. A curvature value of a certain point on a surface of the object may represent a degree of curvature of at least one curve passing through the certain point, determined on the surface of the object. In this case, curves passing through the certain point may have different degrees of curvature depending on the direction. Therefore, the three-dimensional model processing apparatus 300 according to an embodiment may determine a largest curvature value as the curvature value of the certain point, but the disclosure is not limited thereto.

When the curvature value of the seed point determined on the three-dimensional model has a value within a preset range, the three-dimensional model processing apparatus 300 according to an embodiment may determine the seed point as the reference point. In contrast, when the curvature value of the seed point does not have a value within the preset range, the three-dimensional model processing apparatus 300 may determine another point having a curvature value within the preset range as the reference point.

As another example, when the seed point is in a preset area (e.g., a segmentation area), the three-dimensional model processing apparatus 300 may determine at least one reference point within the area. When there are one or more reference points, selection areas respectively selected from the reference points may be combined and determined as an area corresponding to the object.

In operation S403, the three-dimensional model processing apparatus 300 according to an embodiment may determine an area corresponding to an object by gradually expanding a selection area based on the reference point. The three-dimensional model processing apparatus 300 may determine an area corresponding to the object by gradually expanding the selection area based on a curvature value of the reference point.

The three-dimensional model processing apparatus 300 may determine an area of an object having a curvature value within a threshold range with respect to the curvature value of the reference point.

The three-dimensional model processing apparatus 300 may use a k1 value of the reference point, both k1 and k2 values, or a smaller value between the k1 value and the k2 value, as a reference value for selecting an object area.

Also, the three-dimensional model processing apparatus 300 according to an embodiment may determine a first area corresponding to the object having the curvature value within the threshold range with respect to the curvature value of the reference point. The three-dimensional model processing apparatus 300 may determine a second area corresponding to the object by repeatedly performing area expansion and shrinkage process from the determined first area. The three-dimensional model processing apparatus 300 may determine the second area as a final area corresponding to the object.

In this case, the three-dimensional model processing apparatus 300 may change a threshold range of curvature values for determining the object area, based on a drag input of the user. The three-dimensional model processing apparatus 300 may determine an area corresponding to the object, based on the changed threshold range.

In operation S404, the three-dimensional model processing apparatus 300 according to an embodiment may display, on the three-dimensional model, an area determined as the area corresponding to the object. The three-dimensional model processing apparatus 300 may display the area determined as the area corresponding to the object, to be distinguished from other areas, by using color, contrast, lines, or texture.

Hereinafter, a case in which an area corresponding to a first tooth is determined from a three-dimensional model for a plurality of teeth will be used as an example to describe a specific operation method according to the disclosure. However, various embodiments of the disclosure are not limited to determining a tooth area on a three-dimensional model, and as described above, the method of the disclosure may also be applied to determine an area corresponding to at least one of a tooth, gingiva, and an artificial structure. Redundant descriptions are not provided herein.

Figure 5:
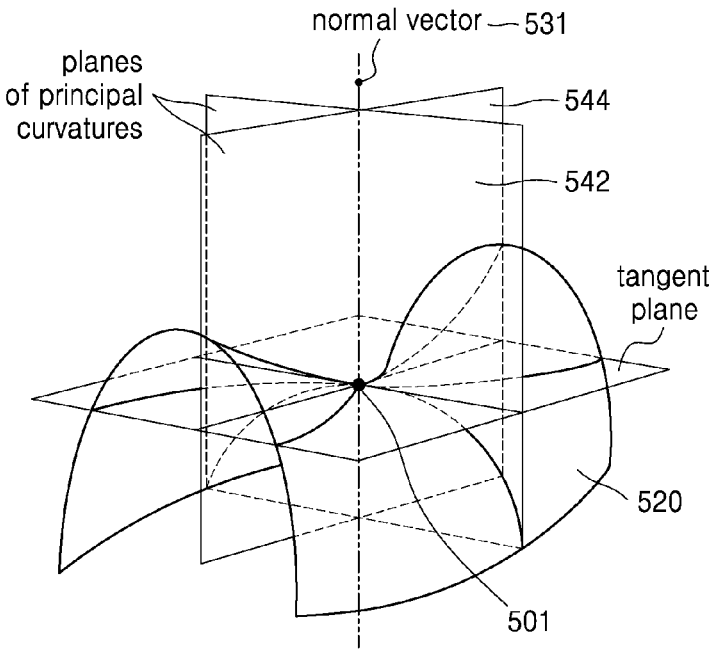
FIG. 5 is a diagram for describing a curvature value calculated from a seed point, according to an embodiment.

FIG. 5 is a diagram for describing a curvature value calculated from a seed point, according to an embodiment.

The three-dimensional model processing apparatus 300 according to an embodiment may calculate a curvature value of a seed point 501.

The three-dimensional model processing apparatus 300 may calculate curvature values of curves where normal planes including a normal vector 531 (or normal line) of the seed point 501 and a curved surface 520 of a tooth cross each other. The three-dimensional model processing apparatus 300 may determine that a curvature value k1 of a curve where a first normal plane 542 and the curved surface 520 of the tooth cross each other, among the calculated curvature values, has a largest absolute value. Also, the three-dimensional model processing apparatus 300 may calculate a curvature value k2 of a curve where an orthogonal normal plane 544 that is orthogonal to the first normal plane 542 and includes the normal vector 531 of the seed point 501 and the curved surface 520 of the tooth cross each other. The three-dimensional model processing apparatus 300 may use at least one of the k1 and k2 values as the curvature value of the seed point 501.

Figure 6A:
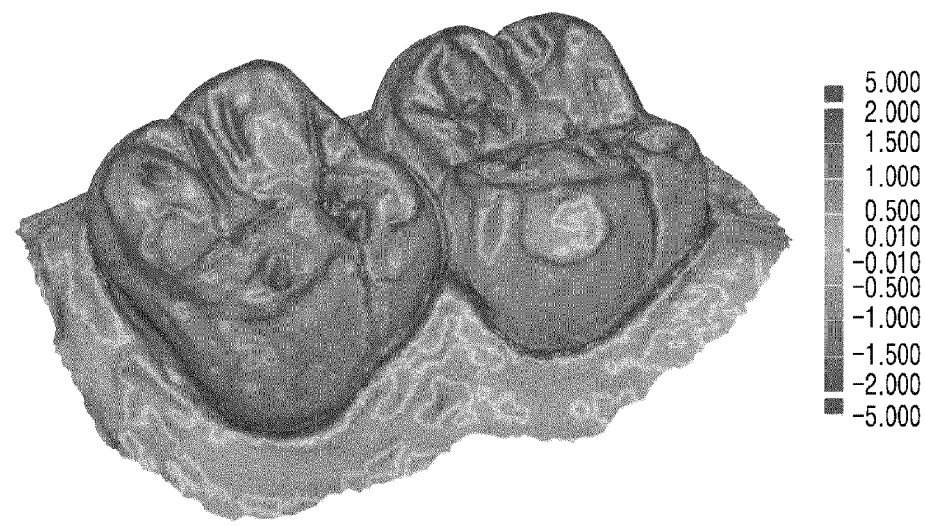
FIG. 6A is a diagram in which k1 values of teeth are indicated in color.

FIG. 6A is a diagram in which k1 values of points on teeth are indicated in color.

As shown in FIG. 6A, points on a cusp area, which is a protruding portion of a tooth, have a relatively large k1 value and thus may be indicated in red. In contrast, points on a groove area recessed in a tooth and points on a boundary area between teeth and gingiva have a relatively small k1 value and may be indicated in blue.

Figure 6B:
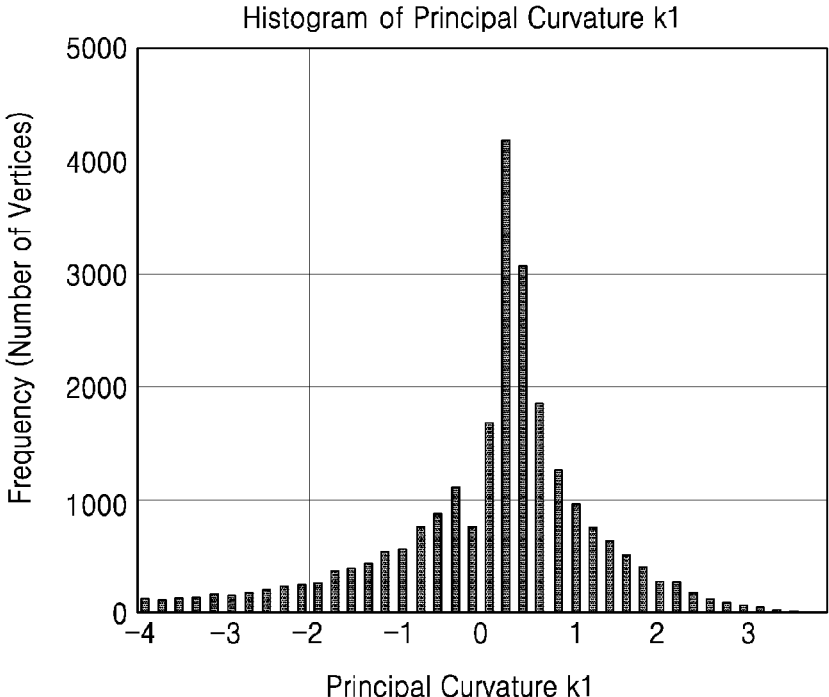
FIG. 6B is a graph representing a distribution of k1 values of a tooth surface.

FIG. 6B is a graph representing a distribution of k1 values of a tooth surface. In more detail, FIG. 6B may be a graph showing a frequency distribution for each section of k1 values of points on a tooth surface.

Referring to FIG. 6B, it may be seen that the points on the tooth surface have a similar distribution to the left and right with an average value as the center, and most of the points have k1 values within a preset range. Accordingly, the three-dimensional model processing apparatus 300 according to an embodiment may identify, as a tooth area, an area including points having curvature values (e.g., k1 values) within a preset range.

In this case, accuracy may be different depending on which point is used to select the tooth area. For example, when a seed point selected by a user is positioned at a cusp of a tooth, the tooth area may be relatively accurately selected, whereas, when the seed point selected by the user is positioned in a groove of the tooth, the tooth area may be relatively inaccurately selected.

Therefore, the three-dimensional model processing apparatus 300 may determine a reference point for selecting the tooth area based on a curvature value of the seed point, thereby increasing area selection accuracy. When the curvature value of the seed point is a value within the preset range, the three-dimensional model processing apparatus 300 according to an embodiment may determine the seed point as the reference point. In contrast, when the curvature value of the seed point is not a value within the preset range, the three-dimensional model processing apparatus 300 may determine, as the reference point, another point having a curvature value within the preset range. The three-dimensional model processing apparatus 300 may determine, as the reference point, a point closest to the seed point from among points having a curvature value within the preset range.

When a curvature value of a selected seed point is not within the preset range, the three-dimensional model processing apparatus 300 may search for a point closest to the seed point among points having a curvature value included in the preset range. For example, the preset range may include a range of curvature values represented by a cusp area of a tooth. The three-dimensional model processing apparatus 300 may search for points in an area within a preset distance (e.g., 0.01-0.02 mm) from the seed point, gradually expand an area to be searched, and determine, as the reference point, a point searched for as having a curvature value included in the preset range.

FIG. 7 shows a seed point and a reference point selected on a tooth, according to an embodiment.

As shown in FIG. 7, when a seed point 701 selected by a user is positioned in a groove of a tooth, a k1 value of the seed point 701 is calculated to be very low. When it is determined that the k1 value of the seed point 701 deviates from a preset range, the three-dimensional model processing apparatus 300 may determine another point as a reference point. That is, because the selected seed point 701 is not a point on a cusp, the three-dimensional model processing apparatus 300 may determine that a tooth area needs to be selected using another point as the reference point. Accordingly, the three-dimensional model processing apparatus 300 may determine, as a reference point 703, a point closest to the seed point 701 and having a curvature value within the preset range, by searching areas around the seed point 701.

The reason why a seed point selected by a user is not used as a reference point and a point having a curvature value within a preset range (e.g., a range of curvature values in a cusp area) is searched for and used as the reference point is because the area selection accuracy is increased only when the tooth area is selected based on a point having a curvature value within the preset range.

Referring to a tooth image of FIG. 6A, points on a boundary area between teeth and gingiva may have relatively small values and be displayed in blue, whereas most of points in a tooth area may have k1 values around an average value and be indicated in yellow.

The three-dimensional model processing apparatus 300 according to an embodiment may select, as a tooth area, an area having a curvature value within a threshold range based on a curvature value of the reference point, while expanding the area around the reference point. Accordingly, when the reference point is included in a blue area (i.e., an area having a relatively small k1 value), it is easy for the three-dimensional model processing apparatus 300 to expand beyond the blue area when expanding a selection area from the reference point.

Hereinafter, a case in which the curvature value of the reference point is within the preset range and a case in which the curvature value of the reference point is not within the preset range will be compared and described in detail with reference to FIG. 8.

Figure 8:
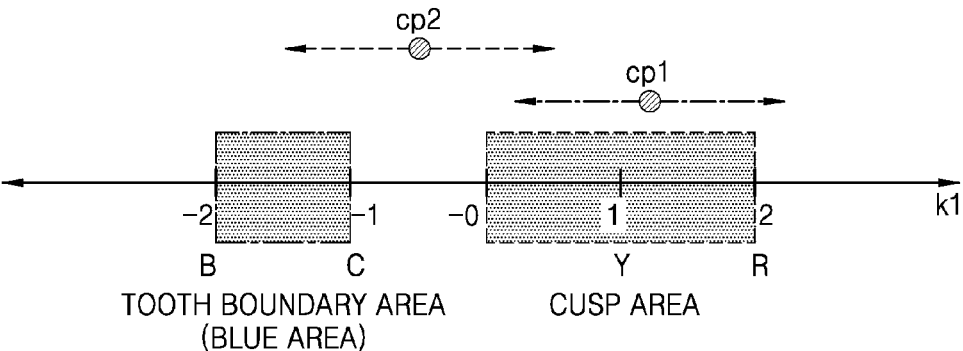
FIG. 8 is a diagram for describing a reference point determined for selecting a tooth area, according to an embodiment.

FIG. 8 is a diagram for describing a reference point determined for selecting a tooth area, according to an embodiment.

In FIG. 8, a range of k1 values of a tooth boundary area and a range of k1 values of a cusp area are shown. The three-dimensional model processing apparatus 300 according to an embodiment may use the range of k1 values of the cusp area as a preset range for determining a reference point. However, the disclosure is not limited to the embodiment of "using the range of k1 values of the cusp area as the preset range", and the preset range for determining the reference point may be determined in various manners.

As shown in FIG. 8, when a curvature value of a first reference point cp1 is within a preset range, the three-dimensional model processing apparatus 300 may select, as a tooth area, an area having a curvature value within a threshold range based on the curvature value of the first reference point cp1. In this case, an area having a curvature value difference from the first reference point cp1 within the threshold range does not deviate from a tooth boundary.

In addition, a curvature value of a second reference point cp2 is outside the preset range, and the three-dimensional model processing apparatus 300 may select, as the tooth area, an area having a curvature value within a threshold range based on the curvature value of the second reference point cp2. In this case, an area having a curvature value of which difference from the curvature value of the second reference point cp2 is within the threshold range includes a portion of the tooth boundary area, and thus, an area selected based on the second reference point cp2 may deviate from the tooth boundary. Therefore, the three-dimensional model processing apparatus 300 according to an embodiment may determine a reference point having a k1 value within a preset range (e.g., a range of k1 values in a cusp area).

As described above with reference to FIGS. 7 and 8, a recessed groove area on an upper surface of the tooth and the tooth boundary area have small curvature values. Accordingly, when an area having a curvature value within a threshold range based on a curvature value of a reference point is selected, the groove area on the upper surface of the tooth may not be selected. Therefore, the three-dimensional model processing apparatus 300 according to an embodiment may select a final area corresponding to a tooth by repeatedly performing an area expansion and shrinkage process from a sporadically selected tooth area. Hereinafter, an area expansion and shrinkage process will be described in detail with reference to FIGS. 9A to 10D.

Figure 9A:
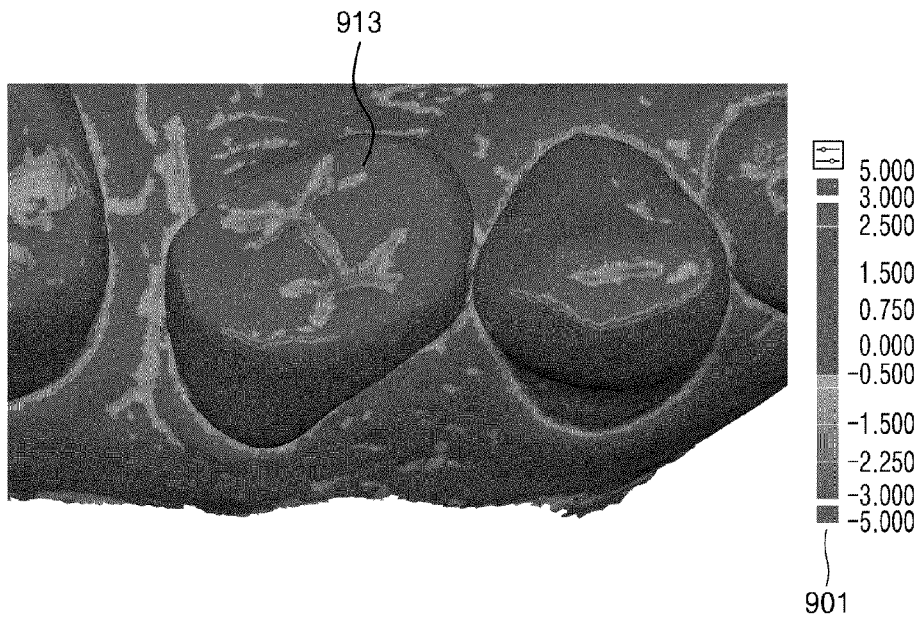
FIG. 9A is a diagram of an area having curvature values within a threshold range on a three-dimensional model for a plurality of teeth, according to an embodiment.

FIG. 9A is a diagram of an area having curvature values within a threshold range on a three-dimensional model for a plurality of teeth, according to an embodiment.

FIG. 9A shows a portion of an image rendered from the three-dimensional model. The three-dimensional model processing apparatus 300 may determine an area having a curvature value within a threshold range based on a curvature value of a reference point. The three-dimensional model processing apparatus 300 may indicate curvature values within the threshold range based on the curvature value of the reference point in a preset color (e.g., green) on a color bar 901. In addition, the three-dimensional model processing apparatus 300 may indicate an area 913 having the curvature value within the threshold range in the same preset color.

Figure 9B:
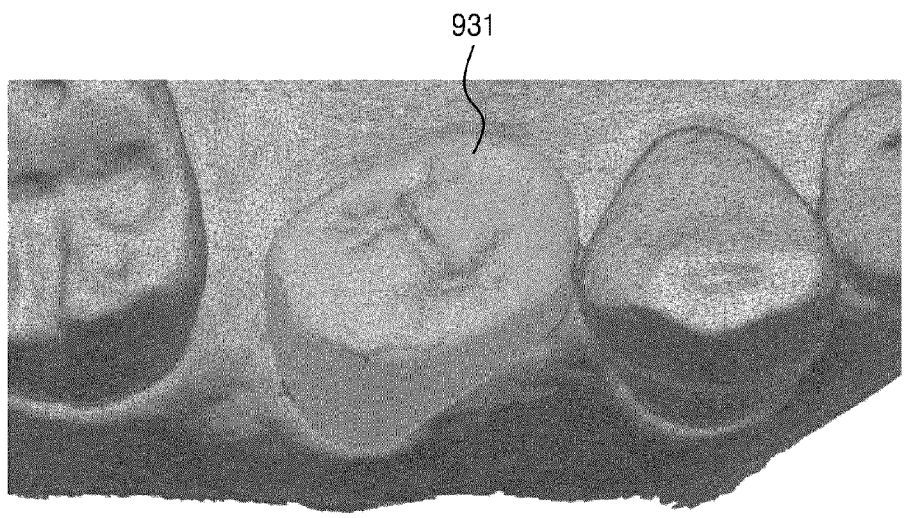
FIG. 9B is a diagram of a sporadically selected tooth area according to an embodiment.

FIG. 9B is a diagram of a sporadically selected tooth area according to an embodiment.

FIG. 9B shows a three-dimensional model represented by triangle meshes. The three-dimensional model processing apparatus 300 according to an embodiment may start from the reference point and expand a selection area by selecting adjacent points each having a curvature value of which difference from the curvature value of the reference point is within the threshold range. When the three-dimensional model processing apparatus 300 reaches a tooth boundary area while expanding the selection area, a difference from the curvature value of the reference point exceeds the threshold range, and thus, the selection area may not be expanded any more. Accordingly, as shown in FIG. 9B, the three-dimensional model processing apparatus 300 may identify a boundary area between teeth and gingiva. However, an area primarily selected by the three-dimensional model processing apparatus 300 may not include a recessed groove area on an upper surface of the tooth.

Therefore, the three-dimensional model processing apparatus 300 according to an embodiment may expand the selection area to fill an empty space of a sporadically selected area.

Figure 10A:
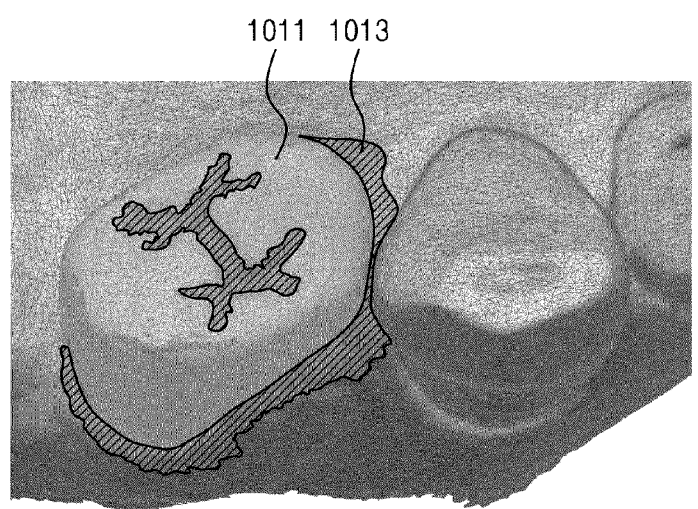
FIG. 10A is a diagram for describing a method of expanding a tooth selection area, according to an embodiment.

FIG. 10A is a diagram for describing a method of expanding a tooth selection area, according to an embodiment.

The three-dimensional model processing apparatus 300 according to an embodiment may expand the selection area by selecting triangle meshes 1013 adjacent to a boundary of a first selection area 1011.

Figure 10B:
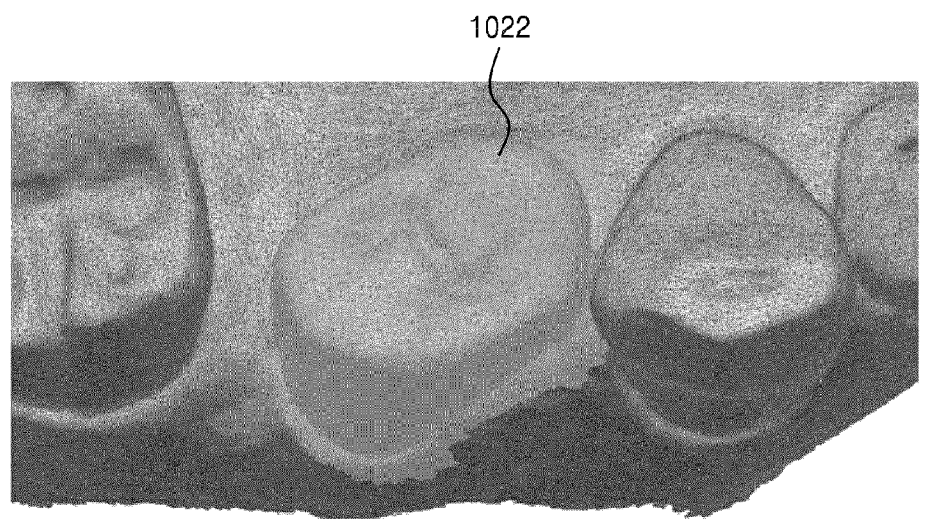
FIG. 10B is a diagram of an expanded tooth area according to an embodiment.

FIG. 10B is a diagram of an expanded tooth area according to an embodiment.

As shown in FIG. 10B, even an area not previously selected may be selected by expanding the selection area. An expanded tooth area 1022 of FIG. 10B does not include any empty space.

Figure 10C:
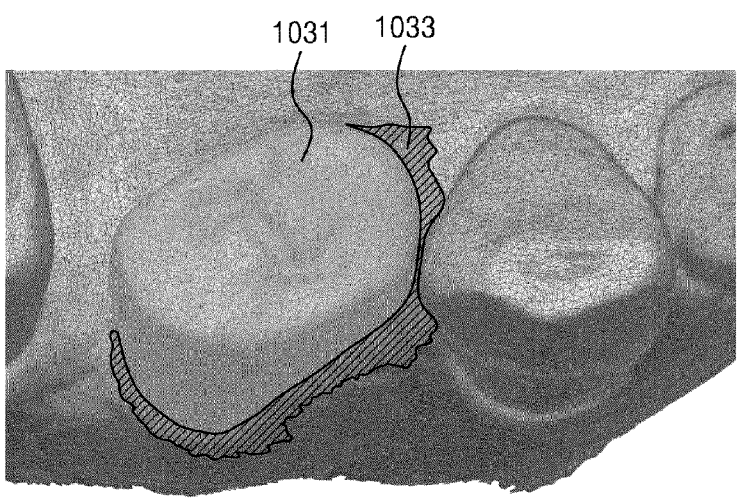
FIG. 10C is a diagram for describing a method of shrinking an expanded tooth area, according to an embodiment.

FIG. 10C is a diagram for describing a method of shrinking an expanded tooth area, according to an embodiment.

The three-dimensional model processing apparatus 300 according to an embodiment may shrink the selection area, by excluding triangle meshes 1033 adjacent to a boundary of the expanded tooth area 1022 in an inward direction from the selection area.

Figure 10D:
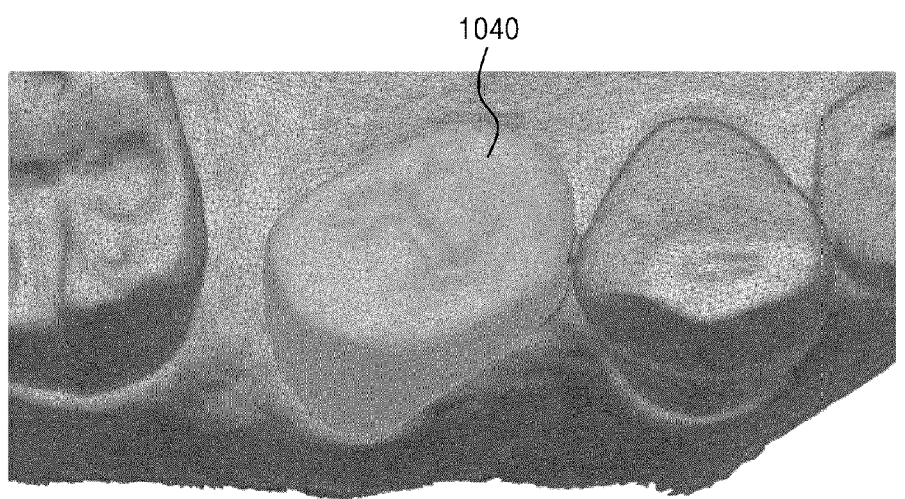
FIG. 10D is a diagram of a tooth area finally determined through an area expansion and shrinkage process, according to an embodiment.

FIG. 10D is a diagram of a tooth area finally determined through an area expansion and shrinkage process, according to an embodiment.

The three-dimensional model processing apparatus 300 according to an embodiment may finally determine an area 1040 corresponding to a tooth, by repeating an area expansion and shrinkage process from a selected tooth area a certain number of times.

In addition, the three-dimensional model processing apparatus 300 according to an embodiment may select a tooth area having a curvature value within a fixed threshold range based on a curvature value of a reference point. That is, the three-dimensional model processing apparatus 300 may select a tooth area having a curvature value of which difference from the curvature value of the reference point is within the threshold range. For example, according to an embodiment, the three-dimensional model processing apparatus 300 may determine the reference point based on a position at which a user clicks, and select a tooth area having a curvature value of which difference from the curvature value of the reference point is within a fixed threshold range.

However, the disclosure is not limited to the aforementioned embodiment, and the three-dimensional model processing apparatus 300 according to an embodiment may select a tooth area having a curvature value within a predetermined threshold range, regardless of the curvature value of the reference point.

Also, according to an embodiment, the three-dimensional model processing apparatus 300 may select the tooth area by flexibly determining the threshold range based on a drag input of the user. The three-dimensional model processing apparatus 300 may change the threshold range of curvature values for selecting the tooth area, based on a dragging user input. The three-dimensional model processing apparatus 300 may select the tooth area based on a changed threshold range.

Figure 11A:
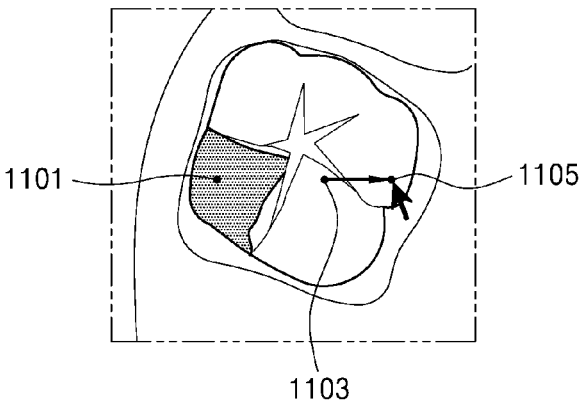
FIG. 11A is a diagram for describing a method of expanding a tooth selection area based on a drag input of a user, according to an embodiment.
Figure 11B:
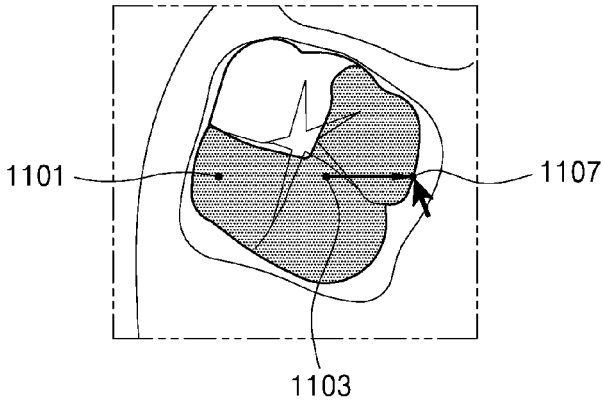
FIG. 11B is a diagram for describing a method of expanding a tooth selection area based on a drag input of a user, according to an embodiment.
Figure 11C:
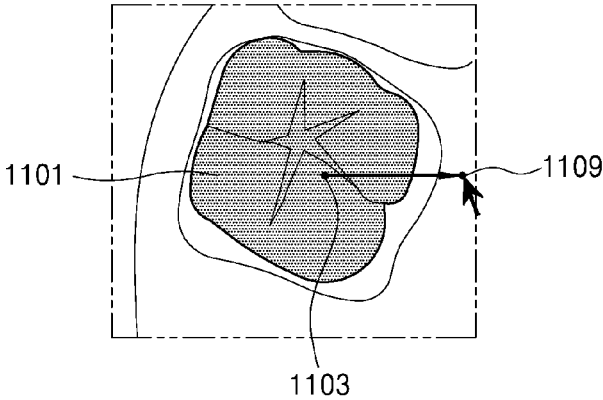
FIG. 11C is a diagram for describing a method of expanding a tooth selection area based on a drag input of a user, according to an embodiment.

FIGS. 11A, 11B, and 11C are diagrams for describing a method of expanding a tooth selection area based on a drag input of a user, according to an embodiment.

FIGS. 11A, 11B, and 11C show an image rendered from a three-dimensional model.

As shown in FIG. 11A, when a user clicks an arbitrary position on the three-dimensional model, the three-dimensional model processing apparatus 300 may determine a seed point 1103 corresponding to the position at which the user clicked. The three-dimensional model processing apparatus 300 may determine that a curvature value of the seed point 1103 deviates from a preset range, and determine a reference point 1101 adjacent to the seed point 1103. The three-dimensional model processing apparatus 300 may select an area having a curvature value within a first range based on a curvature value of the reference point 1101. The first range may include a preset threshold range.

When the user drags a pointer from the seed point 1103 to a first point 1105, the three-dimensional model processing apparatus 300 may change the threshold range from the first range to a second range. The second range may have a value greater than that of the first range. The three-dimensional model processing apparatus 300 may also increase a value of the threshold range in response to an increase in a drag distance. The three-dimensional model processing apparatus 300 may select an area having a curvature value within the second range based on the curvature value of the reference point 1101, and display the selected area.

As shown in FIG. 11B, when the user drags the pointer longer to a second point 1107, the three-dimensional model processing apparatus 300 may change the threshold range from the second range to a third range. The third range may have a value greater than that of the second range. The three-dimensional model processing apparatus 300 may also increase the threshold range in response to the increase in the drag distance. In response to an increase in the threshold range, an area selected by the three-dimensional model processing apparatus 300 is also expanded. The three-dimensional model processing apparatus 300 may select an area having a curvature value within the third range based on the curvature value of the reference point 1101, and display the selected area. In may be seen that the area selected in FIG. 11B is greater than the area selected in FIG. 11A.

As shown in FIG. 11C, when the user drags the pointer longer from the seed point 1103 to a third point 1109, the three-dimensional model processing apparatus 300 may change the threshold range from the third range to a fourth range. The fourth range may be greater than the third range. The three-dimensional model processing apparatus 300 may select an area having a curvature value within the fourth range based on the curvature value of the reference point 1101, and display the selected area. In may be seen that the area selected in FIG. 11C is greater than the area selected in FIG. 11B.

The three-dimensional model processing apparatus 300 may expand the selection area by increasing the threshold range in response to an increase in a drag input of the user, and may not further expand the selection area to an area having a curvature value less than or equal to a threshold value. The three-dimensional model processing apparatus 300 may determine the threshold value, such that the selection area is not expanded beyond a boundary between teeth and gingiva.

Hereinafter, interface screens provided to a user to implement the aforementioned tooth area selection method will be described with reference to FIGS. 12 to 14. However, the disclosure is not limited to the examples shown in the drawings, and may be variously modified depending on implementation.

Figure 12:
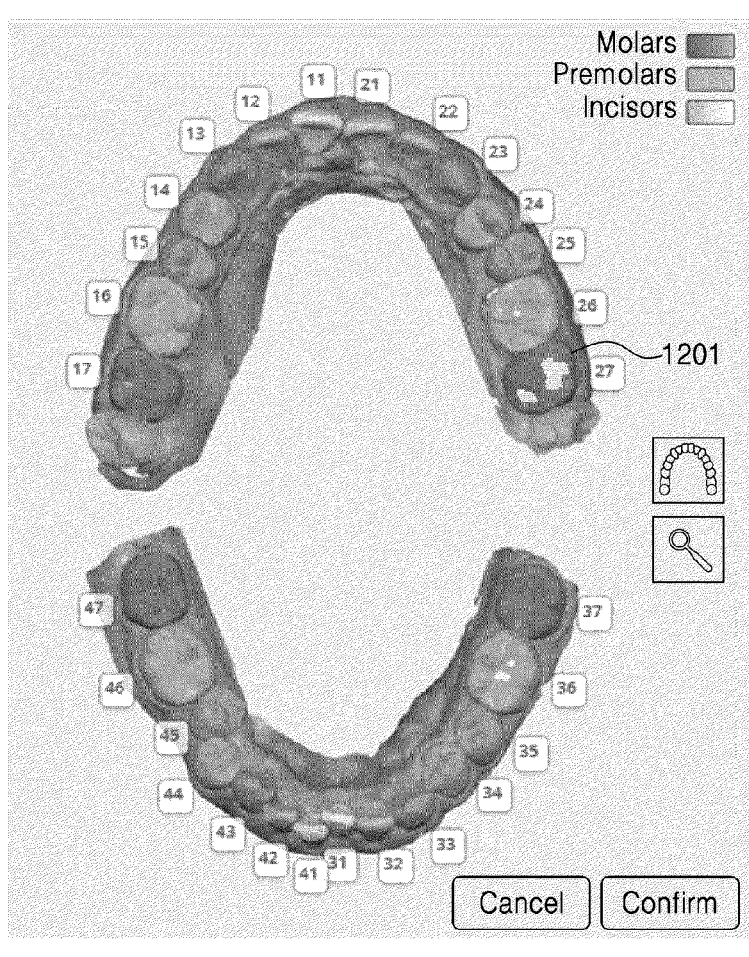
FIG. 12 shows an example of a driving screen of a program to which a tooth area selection method is applied, according to an embodiment.
Figure 13A:
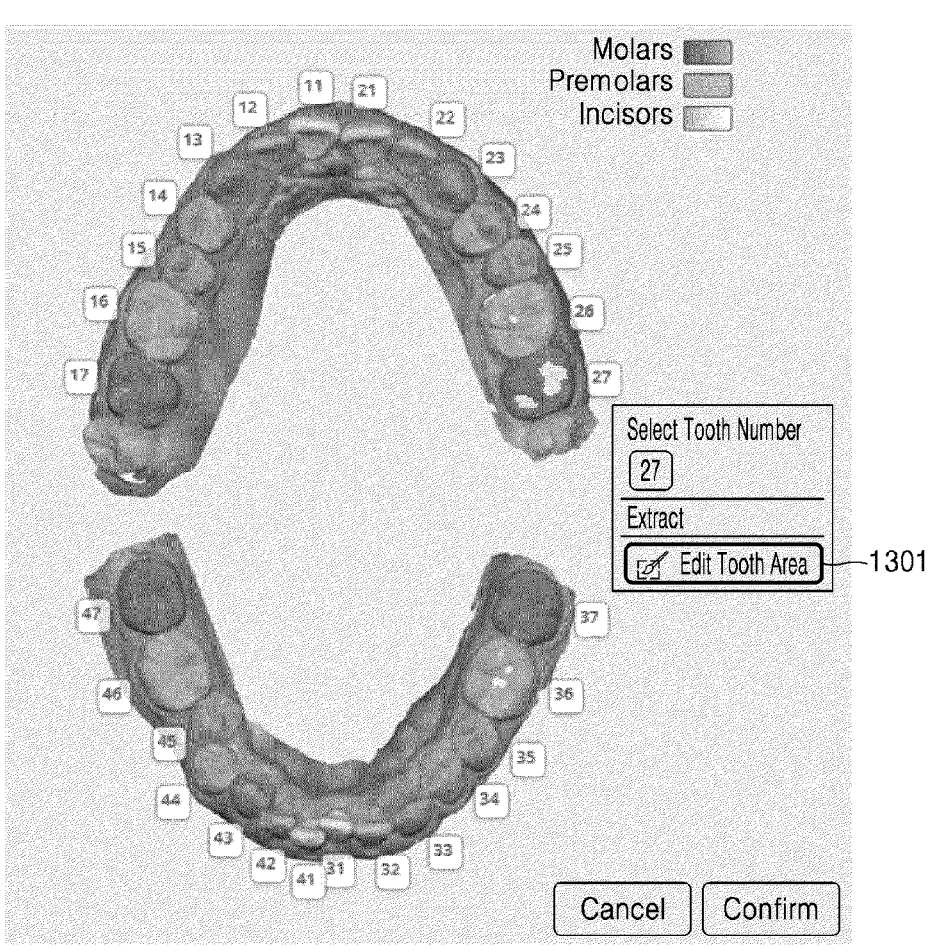
FIG. 13A shows an example of a driving screen of a program to which a tooth area selection method is applied, according to an embodiment.
Figure 13B:
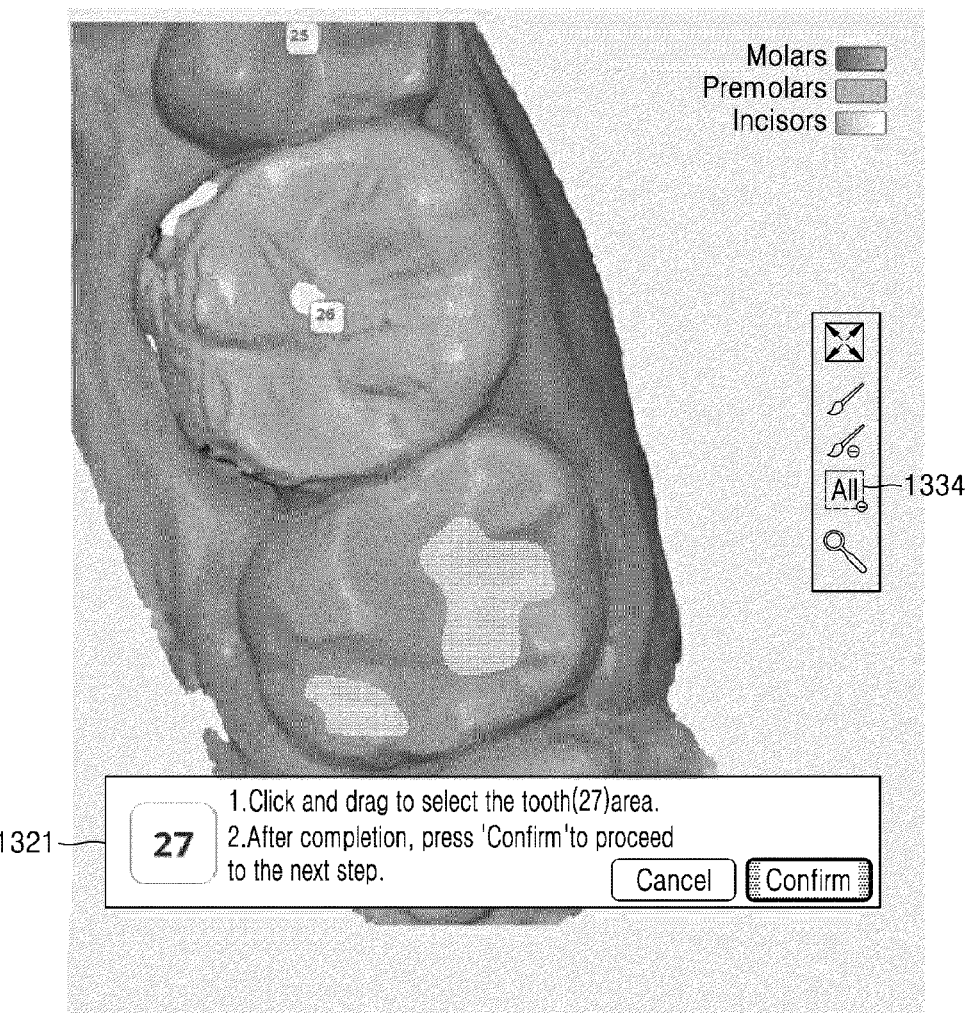
FIG. 13B shows an example of a driving screen of a program to which a tooth area selection method is applied, according to an embodiment.
Figure 13C:
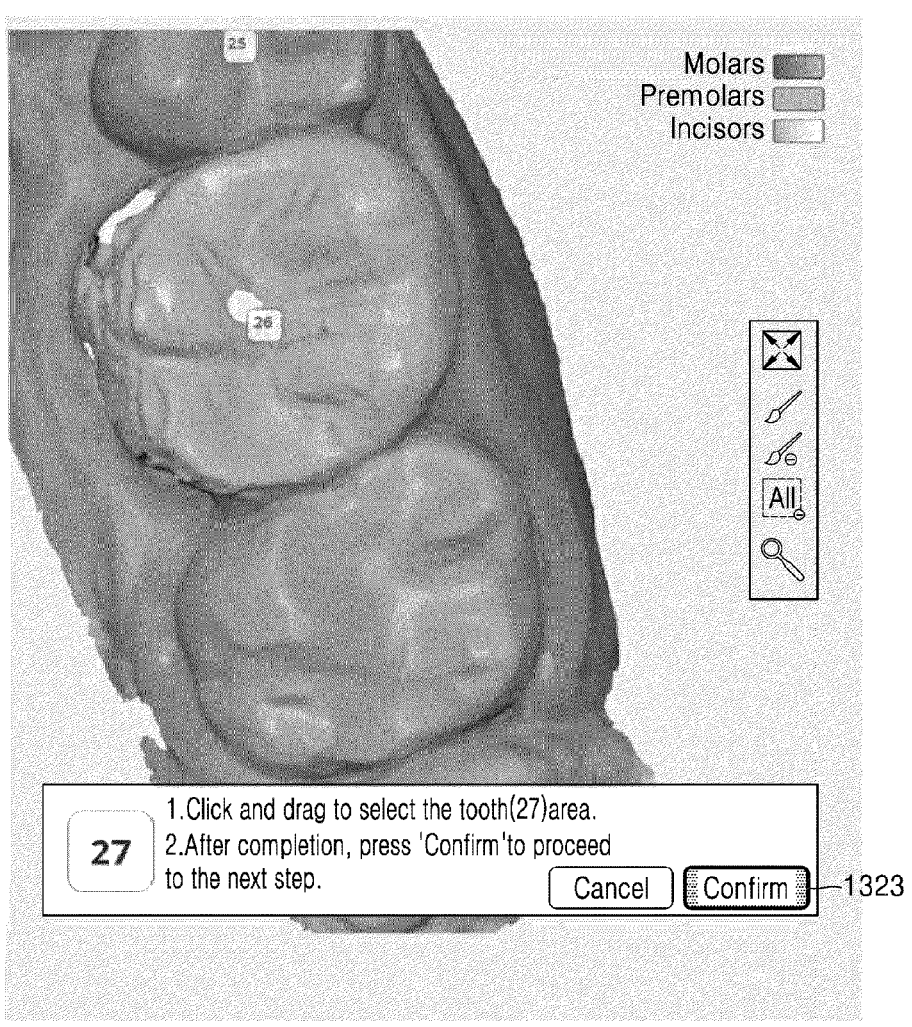
FIG. 13C shows an example of a driving screen of a program to which a tooth area selection method is applied, according to an embodiment.
Figure 14:
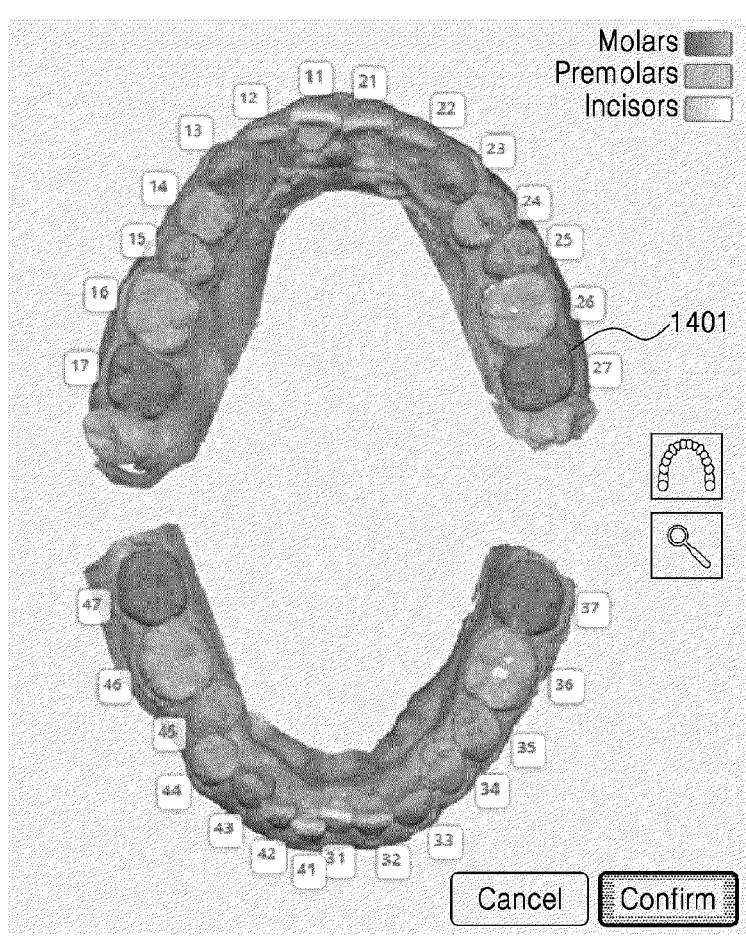
FIG. 14 shows an example of a driving screen of a program to which a tooth area selection method is applied, according to an embodiment.

FIGS. 12 to 14 show an example of a driving screen of a program to which a tooth area selection method is applied, according to an embodiment.

As shown in FIG. 12, the three-dimensional model processing apparatus 300 may display a three-dimensional model in which areas corresponding to a plurality of teeth are identified, through a segmentation of the three-dimensional model. The three-dimensional model processing apparatus 300 may assign a unique number to each tooth, automatically determine each tooth area, and display each tooth area on a screen. The three-dimensional model processing apparatus 300 may display an image in which the plurality of teeth and tooth numbers corresponding to respective teeth are displayed on the three-dimensional model.

The user may review that individual tooth areas have been properly selected. The user may identify that an empty space is included in an area corresponding to a tooth 1201, and determine that a tooth area is incorrectly selected and thus needs to be selected again. The user may select the tooth 1201 or click an icon indicated by 27, which is a unique number of a tooth.

When the user receives an input for selecting a certain tooth, the three-dimensional model processing apparatus 300 may display a pop-up window asking whether to reselect a certain tooth area, as shown in FIG. 13A. When a user input (e.g., a user input clicking an icon 1301) for requesting reselection of the tooth area using a smart selection function is received, the three-dimensional model processing apparatus 300 may display a screen in which a certain tooth portion is enlarged, as shown in FIG. 13B.

As shown in FIG. 13B, because a partial area of an upper surface of a tooth 27 is not properly selected, and thus, the user may click an icon 1334 to deselect the entire preselected area. When a user input clicking the icon 1334 for deselection is received, the three-dimensional model processing apparatus 300 may display a pop-up window 1321 for guiding a smart selection function.

The user may select the tooth area by clicking or clicking and dragging an arbitrary position of the tooth 27 according to instructions in the pop-up window 1321. The description provided above with reference to FIGS. 4 to 11 may be applied to a specific method, performed by the three-dimensional model processing apparatus 300, of selecting the tooth area based on a user input. Redundant descriptions are not provided herein.

As shown in FIG. 13C, when it is determined that the tooth area is properly selected without any empty space, the user clicks an icon 1323 to confirm that the selection is complete.

When a user input clicking the icon 1323 for confirmation is received, the three-dimensional model processing apparatus 300 may return to an initial screen displaying all of the plurality of teeth, as shown in FIG. 14. According to an embodiment, it may be seen that a tooth 27 area 1401 is accurately reselected by the smart selection function.

As described above, the three-dimensional model processing apparatus 300 according to an embodiment of the disclosure may accurately and quickly select individual tooth areas only with a few clicks (or drags), thereby promoting user convenience and reducing work time.

Figure 15:
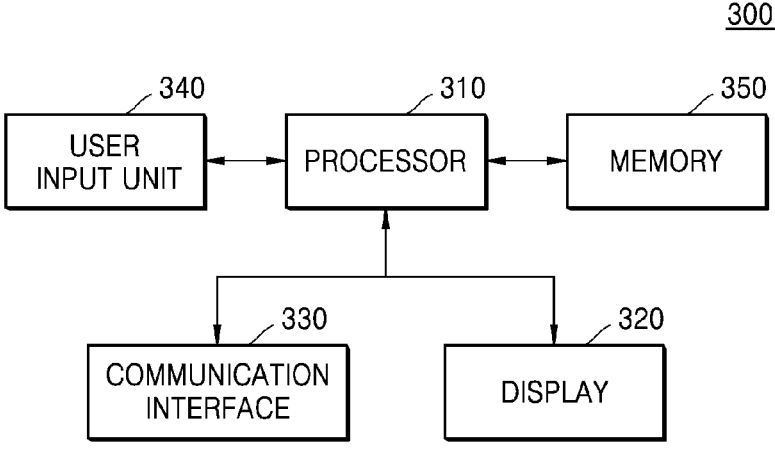
FIG. 15 is a block diagram of a three-dimensional model processing apparatus according to an embodiment.

FIG. 15 is a block diagram of a three-dimensional model processing apparatus according to an embodiment.

The three-dimensional model processing apparatus 300 shown in FIG. 15 may perform a three-dimensional model processing method according to various embodiments of the disclosure, and the description provided above with reference to FIGS. 1 to 14 may be applied thereto. Thus, the descriptions provided above are not provided again.

The three-dimensional model processing apparatus 300 according to an embodiment may be connected to an external apparatus such as a three-dimensional scanning apparatus, or an external server through a wired or wireless communication network, and may obtain a three-dimensional model of an object.

The three-dimensional model processing apparatus 300 may include any electronic apparatus capable of generating, processing, displaying, and/or transmitting a three-dimensional image of the object, based on the obtained three-dimensional model. The three-dimensional model processing apparatus 300 according to various embodiments of the disclosure may include a fixed terminal or a mobile terminal. The three-dimensional model processing apparatus 300 may include, e.g., a computing apparatus, such as a smartphone, a laptop computer, a desktop computer, a PDA, or a tablet PC, but is not limited thereto.

Referring to FIG. 15, the three-dimensional model processing apparatus 300 may include a processor 310, the display 320, a communication interface 330, a user input unit 340, and a memory 350.

The processor 310 according to an embodiment may execute at least one instruction to control the three-dimensional model processing apparatus 300 to perform an intended operation. The at least one instruction may be stored in an internal memory (not shown) included in the processor 310, or the separate memory 350.

The processor 310 according to an embodiment may execute the at least one instruction to control at least one element included in the three-dimensional model processing apparatus 300 to perform an intended operation. Accordingly, even though a case in which the processor 310 performs a certain operation is described as an example, it may mean that the processor 310 controls the at least one element included in the three-dimensional model processing apparatus 300, such that the at least one element performs a certain operation.

The processor 310 according to an embodiment may include a random access memory (RAM) (not shown) which stores a signal or data input from the outside of the three-dimensional model processing apparatus 300 or is used as a storage area corresponding to various operations performed by the three-dimensional model processing apparatus 300, a control program for controlling the three-dimensional model processing apparatus 300, and/or a read-only memory (ROM) (not shown) storing a plurality of instructions, and at least one internal processor (not shown) executing at least one instruction.

Also, the processor 310 may include a graphic processing unit (GPU) (not shown) for graphic processing corresponding to a video. In addition, the processor 310 may be implemented as a system on chip (SoC) in which a core (not shown) and a GPU (not shown) are integrated.

In the disclosed embodiment, the processor 310 may generate an image by rendering a three-dimensional model of the oral cavity. For example, the three-dimensional model may include surface shape information of the oral cavity including at least one of a plurality of teeth, gingiva, and an artificial structure.

The display 320 may display a certain screen under the control by the processor 310. In detail, the display 320 may display a user interface screen including the three-dimensional model. Alternatively, the display 320 may display a user interface screen including information related to diagnosis and treatment for the object.

The communication interface 330 may perform communication with at least one external electronic apparatus (not shown) or a server (not shown) through a wired or wireless communication network.

The user input unit 340 may receive a user input for controlling the three-dimensional model processing apparatus 300. The user input unit 340 may include a user input apparatus including a touch panel for detecting a touch of a user, a button for receiving a push operation of the user, a mouse for indicating or selecting a point on the user interface screen, or a keyboard, but is not limited thereto.

Also, the user input unit 340 may include a speech recognition apparatus (not shown) for speech recognition. For example, the speech recognition apparatus (not shown) may include a microphone, and the speech recognition apparatus may receive a speech command or a speech request of a user. Accordingly, the processor 310 may control an operation corresponding to the speech command or the speech request to be performed.

The memory 350 may include at least one instruction executed by the processor 310. Also, the memory 350 may store at least one program executed by the processor 310. The memory 350 may store data (e.g., raw data obtained through object scanning, two-dimensional image data, and a three-dimensional model) received from the external apparatus or the external server. The memory 350 may store an object image indicating the object in three dimensions.

The processor 310 according to an embodiment may control an overall operation of the three-dimensional model processing apparatus 300, by executing the program stored in the memory 350.

The description provided above with reference to FIG. 4 may be applied to a specific method, performed by the processor 310, of selecting an object area by processing a three-dimensional model, and redundant descriptions are not provided herein.

First, the processor 310 according to an embodiment may obtain a three-dimensional model of the oral cavity. The processor 310 may determine a reference point on the three-dimensional model, gradually expand a selection area based on the reference point, and determine an area corresponding to an object. The processor 310 may display the area corresponding to the object on the three-dimensional model through the display 320.

The processor 310 according to an embodiment may automatically or manually determine a seed point on the three-dimensional model, and determine a reference point based on a curvature value of the seed point. The processor 310 may determine the area corresponding to the object by gradually expanding the selection area based on the curvature value of the reference point.

For example, the processor 310 may select a seed point on a first tooth among a plurality of teeth represented by the three-dimensional model. The processor 310 may control the display 320 to display, on a screen, an image rendered from the three-dimensional model. The processor 310 may receive a user input for selecting a point on the rendered image, and determine the seed point on the three-dimensional model based on a position of the selected point on the rendered image.

The processor 310 according to an embodiment may determine a reference point on the first tooth, based on a curvature value of the seed point. The processor 310 may use at least one of a k1 value and a k2 value as the curvature value of the seed point. The processor 310 according to an embodiment determines a reference point for selecting the tooth area based on the curvature value of the seed point, thereby increasing the area selection accuracy.

When the curvature value of the seed point is within a preset range, the processor 310 may determine the seed point as the reference point. In contrast, when the curvature value of the seed point is not within the preset range, the processor 310 may determine, as the reference point, another point having a curvature value within the preset range. The processor 310 may determine, as the reference point, a closest point having a curvature value within the preset range.

When the curvature value of the selected seed point is not within the preset range, the processor 310 may search for a point closest to the seed point among points having a curvature value included in the preset range. The processor 310 may search for points in an area within a preset distance (e.g., 0.01-0.02 mm) from the seed point, gradually expand an area to be searched, and determine, as the reference point, a point searched for as having a curvature value included in the preset range.

The processor 310 according to an embodiment may determine an area corresponding to the first tooth by gradually expanding the selection area based on the curvature value of the reference point.

The processor 310 may select a tooth area having a curvature value within a threshold range based on the curvature value of the reference point, by gradually expanding the selection area from the reference point.

The processor 310 may use a k1 value of the reference point or both k1 and k2 values, as a reference point for selecting the tooth area. The processor 310 according to an embodiment may select a final area corresponding to a tooth by repeatedly performing an area expansion and shrinkage process from a sporadically selected tooth area.

In addition, the processor 310 according to an embodiment may select a tooth area having a curvature value within a fixed threshold range based on the curvature value of the reference point. That is, the processor 310 may select a tooth area having a curvature value of which difference from the curvature value of the reference point is within the threshold range.

However, the disclosure is not limited to the aforementioned embodiment, and the processor 310 according to an embodiment may select a tooth area having a curvature value within a predetermined threshold range, regardless of the curvature value of the reference point.

Also, according to an embodiment, the processor 310 may select the tooth area by flexibly determining the threshold range based on a drag input of the user. The processor 310 may change a threshold range of curvature values for selecting the tooth area, based on a dragging user input with respect to the curvature value of the reference point. The processor 310 may select the tooth area based on the changed threshold range. For example, the processor 310 may increase a value of the threshold range in response to an increase in a drag distance. In response to the increase in the threshold range, the processor 310 may expand the selection area. However, the processor 310 may expand the selection area by increasing the value of the threshold range in response to an increase in a drag input of the user, and may not further expand the selection area to an area having a curvature value less than or equal to a certain value. The processor 310 may determine the certain value, such that the selection area is not expanded beyond a boundary between teeth and gingiva.

The three-dimensional model processing method according to various embodiments of the disclosure described above may be embodied as program commands executable by various computer means and may be recorded on a computer-readable medium. Also, according to the embodiment of the disclosure, a computer-readable storage medium having recorded thereon at least one program including at least one instruction executing a method of obtaining a three-dimensional model may be provided.

The computer-readable storage medium may include program commands, a data file, a data structure, etc. alone or in combination. In this case, examples of the computer-readable storage medium may include magnetic media such as hard disks, floppy disks, and magnetic tapes, optical media such as compact disc (CD)-ROMs, or digital versatile discs (DVDs), magneto-optical media such as floptical disks, and hardware apparatuses specifically configured to store and execute program commands, such as ROM, RAM, flash memories, etc.

In this regard, a machine-readable storage medium may be provided in a form of a non-transitory storage medium. Here, the 'non-transitory storage medium' may mean that a storage medium is a tangible apparatus. Also, the 'non-transitory storage medium' may include a buffer where data is temporarily stored.

According to an embodiment, a method of displaying an oral cavity image according to various embodiments disclosed in the present specification may be provided by being included in a computer program product. The computer program product may be distributed in a form of a machine-readable storage medium (e.g., a CD-ROM). Alternatively, the computer program product may be distributed (e.g., downloaded or uploaded) online via an application store (e.g., Play Store™) or directly between two user apparatuses (e.g., smart phones).

While the disclosure has been described in detail with reference to certain embodiments thereof, the scope of the disclosure is not limited to the description and also includes various modifications and improvements made by those of ordinary skill in the art using the concept of the disclosure defined in the appended claims.

The invention claimed is:

1. An area determination method for determining an area corresponding to an object from a three-dimensional model of an oral cavity, the area determination method comprising:
obtaining the three-dimensional model;
determining a seed point on the three-dimensional model;
determining the seed point as a reference point, based on a curvature value of the seed point determined on the three-dimensional model being within a preset range;
determining an area corresponding to an object, by gradually expanding a selection area by selecting adjacent points each having a curvature value of which difference between a curvature value of the reference point is within a threshold range; and
displaying the determined area on the three-dimensional model,
wherein the curvature value of the seed point is determined one of curvature values of curves where normal planes and a curved surface of the object cross each other, the normal planes including a normal line of the seed point.

2. The area determination method of claim 1, wherein the three-dimensional model is obtained by a three-dimensional scanning apparatus and comprises surface shape information of a plurality of teeth and gingiva in the oral cavity, and the object is a tooth or gingiva.

3. The area determination method of claim 1, wherein the determining of the seed point comprises:
displaying the three-dimensional model; and
determining the seed point, based on a user input for the displayed three-dimensional model.

4. The area determination method of claim 1, wherein the curvature value of the seed point comprises at least one of a curvature value k1 having a largest absolute value among the curvature values and a curvature value k2 of a curve where an orthogonal normal plane and the curved surface of the object cross each other, the curvature value k1 is a curvature value of a curve where a first normal plane among the normal planes and the curved surface of the object cross each other, and the orthogonal normal plane is orthogonal to the first normal plane and includes the normal line of the seed point.

5. The area determination method of claim 1, further comprising:
when the curvature value of the seed point is not within the preset range, determining, as the reference point, another point having a curvature value within the preset range.

6. The area determination method of claim 1, wherein the determining of the area corresponding to the object further comprises determining the area corresponding to the object, by repeating an area expansion and shrinkage process from the selection area.

7. The area determination method of claim 1, the area determination method further comprising:
changing the threshold range, based on a drag input of a user; and
determining the second area corresponding to the object, based on the changed threshold range.

8. The area determination method of claim 1, wherein the determining of the seed point comprises:
performing segmentation of dividing the three-dimensional model into areas corresponding to a plurality of objects; and
determining the seed point on one of the plurality of areas.

9. The area determination method of claim 1, further comprising:
displaying an image in which a plurality of teeth and a tooth number corresponding to each of the plurality of teeth are displayed on the three-dimensional model; and
receiving a user input for selecting, as the object, a first tooth from among the plurality of teeth,
wherein the determining of the seed point comprises determining the seed point on the first tooth.

10. A three-dimensional model processing apparatus for processing a three-dimensional model of an oral cavity, the three-dimensional model processing apparatus comprising:
a display displaying an image rendered from the three-dimensional model; and
at least one processor configured to
determine a seed point on the three-dimensional model,
determine the seed point as a reference point, based on a curvature of the seed point determined on the three-dimensional model being within a preset range,
determine an area corresponding to an object, by gradually expanding a selection area by selecting adjacent points each having a curvature value of which difference between a curvature value of the reference point is within a threshold range, and
control the display to display the area determined on the three-dimensional model,
wherein the curvature value of the seed point is determined one of curvature values of curves where normal planes and a curved surface of the object cross each other, the normal planes including a normal line of the seed point.

11. The three-dimensional model processing apparatus of claim 10, wherein the display displays the three-dimensional model, and the at least one processor is further configured to determine the seed point, based on selection information associated with the displayed three-dimensional model.

12. The three-dimensional model processing apparatus of claim 10, wherein the at least one processor is further configured to, determine the area corresponding to the object, by repeating an area expansion and shrinkage process from the selection area.

13. The three-dimensional model processing apparatus of claim 10, wherein the display displays an image in which a plurality of teeth and a tooth number corresponding to each of the plurality of teeth are displayed on the three-dimensional model, and the at least one processor is further configured to receive selection information corresponding to a selection of a first tooth from among the plurality of teeth as the object, and determine the seed point on the first tooth.

14. An area determination method for determining an area from a three-dimensional model, the area determination method comprising:

obtaining a three-dimensional model of an oral cavity;

determining at least a partial area of an area to be selected in the oral cavity;

determining a seed point on the determined at least partial area;

determining the seed point as a reference point, based on a curvature value of the seed point determined on the three-dimensional model being within a preset range;

determining, from the three-dimensional model, a first area corresponding to the area to be selected, by selecting adjacent points each having a curvature value of which difference between a curvature value of the reference point is within a threshold range; and displaying the determined first area, wherein the curvature value of the seed point is determined one of curvature values of curves where normal planes and a curved surface of the object cross each other, the normal planes including a normal line of the seed point.

15. The area determination method of claim 14, wherein the determining of the at least partial area comprises determining the at least partial area, based on a user input.

16. The area determination method of claim 15, wherein the user input comprises at least one gesture among a click, a hover, and a drag.

17. The area determination method of claim 14, further comprising performing segmentation of dividing the three-dimensional model into a plurality of areas respectively corresponding to a plurality of teeth, wherein the determining of the at least partial area comprises:

based on the segmented three-dimensional model, selecting one tooth from among the plurality of teeth; and wherein the determining of the first area comprises:

determining the first area, based on the seed point on the selected tooth.

\* \* \* \* \*